J. F. GOUNLEY.
BLACK LEADING MACHINE.
APPLICATION FILED JUNE 12, 1912.
1,134,607.
Patented Apr. 6, 1915.
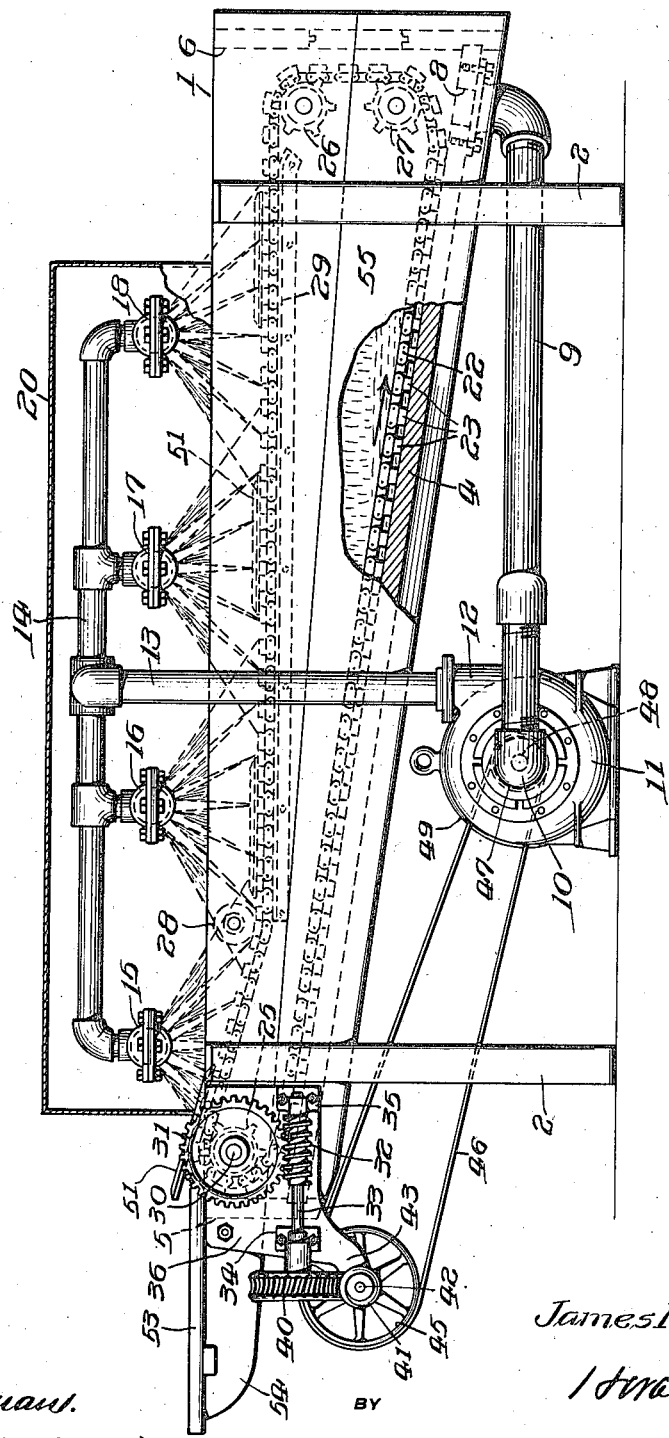
WITNESSES
F. J. Hartman
Clifton C. Hallowell
INVENTOR
James F. Gounley.
BY
ATTORNEY

UNITED STATES PATENT OFFICE.

JAMES F. GOUNLEY, OF PHILADELPHIA, PENNSYLVANIA, ASSIGNOR TO ROYAL ELECTROTYPE COMPANY, A CORPORATION OF PENNSYLVANIA.

BLACKLEADING-MACHINE.

1,134,607.

Specification of Letters Patent. Patented Apr. 6, 1915.

Application filed June 12, 1912. Serial No. 703,141.

*To all whom it may concern:*

Be it known that I, JAMES F. GOUNLEY, a citizen of the United States, and a resident of Philadelphia, county of Philadelphia, and State of Pennsylvania, have invented certain new and useful Improvements in Blackleading-Machines, whereof the following is a specification, reference being had to the accompanying drawings.

This invention particularly relates to that class of machines adapted for spraying matrices, molds or the like with graphite laden fluid, and collecting the drippings in a suitble tank or receptacle from which it may be drawn.

The principal object of this invention is to provide a spraying machine with means for conveying articles to be sprayed, and to utilize said conveying means for agitating the spraying fluid in the tank containing the same, to maintain the solid particles in suspension, and thereby substantially preserve the desired specific gravity.

This invention comprehends a graphite spraying machine having its bottom wall inclined from end to end of the tank, and having an outlet adjacent to its lower end for withdrawing the fluid from said tank; a conveyer having a substantially horizontal portion extending within said tank beneath suitable sprayers, an inclined portion arranged to direct articles carried thereby over the end wall of said tank on to a suitable table or shelf, and a portion supported by and arranged to drag on said inclined bottom in the direction of the declivity; and means connected to draw the fluid from said tank and force it through said sprayers, and to effect the rotative movement of said conveyer.

This invention further includes all the various novel features of construction and arrangement hereinafter more definitely specified.

The accompanying drawing represents a side elevation of a machine constructed in accordance with this invention, certain parts of which being broken away and shown in section for convenience of illustration.

In said drawing the tank or receptacle 1 is supported by the standards 2, and is provided with an inclined bottom 4, sloping downwardly from the end wall 5 at the left hand of the drawing, to the end wall 6 at the right hand of said drawing. The bottom 4 is provided adjacent to its lower end, with the outlet aperture 8, which is connected by the pipe 9 with the inlet 10 of the centrifugal pump 11, having its outlet 12 connected by the pipe 13 with the pipe 14, which is connected with the sprayers 15, 16, 17 and 18, which may be preferably inclosed by the cap or cover 20, suitably supported upon the tank or receptacle 1.

A suitable conveyer is mounted to rotate within the tank or receptacle and comprises sprocket chains 22, connected by transverse slats or cross bars 23 and carried by the driving sprocket 25 and the idler sprockets 26 and 27, and the guiding roller 28, the roller 28 being provided to maintain the portion lying between it and the idler sprocket 26, substantially horizontal, said horizontal portion being conveniently supported intermediate of said roller 28 and idler sprocket 26, by the guiding rails 29, upon which the conveyer is arranged to slide. The driving sprocket 25 is carried by the shaft 30, which has a worm gear 31 in toothed engagement with the worm 32 on the shaft 33, which is journaled in suitable bearings 34 and 35 on the bracket 36. Said shaft 33 is provided with a worm gear 40 in toothed engagement with the worm 41 on the shaft 42, suitably journaled in the hanger 43 of the bracket 36, and provided with a pulley 45, which is connected by the belt 46 with the pulley 47 on the driving shaft 48, which is preferably common to the motor 49, and the centrifugal pump 11.

It will be noted that the shaft 30 is so disposed with respect to the upper perimeter of the tank as to afford an inclined portion of the chains 22 lying between the driving sprocket 25 and the roller 28, whereby the matrices, molds or other articles 51 carried by the conveyer, are diverted from their normal horizontal path of travel through the tank to a relatively inclined path, so as to be discharged over the upper edge of the end wall 5 of said tank on to the table or shelf 53 which is conveniently supported by the extensions 54 of the side walls 55 upon which the brackets 36 are conveniently attached.

The lower or returning portion of the sprocket chains, between the driving sprocket 25 and the idler sprocket 27, is arranged to travel in the direction of the arrow indicated thereon and is supported by the bottom of the tank, or in such close relation thereto that the transverse slats 23 of said conveyer tend to prevent any accumulation of the solid particles of graphite, plumbago or other such material, which, owing to their inability to dissolve and form a solution with the fluid in which they are suspended, tend to precipitate to the bottom, and are forced to circulate in the fluid, by the action of said conveyer, which continuously scrapes said bottom toward the outlet aperture, and by thus preventing any accumulation of the particles, the normal specific gravity of the mixture is substantially maintained.

Although black lead or plumbago is specified in the above description, it is to be understood that a machine constructed in accordance with this invention may as readily be employed for spraying other fluid mixtures.

It is not desired to limit this invention to the precise details of construction and arrangement herein set forth, as it is obvious that various modifications may be made therein without departing from the essential features of the invention as defined in the appended claims.

Having thus described my invention, I claim:

1. A spraying machine having a tank, provided with an inclined bottom, an outlet in said bottom at its lower end, and conveying and agitating means comprising a conveyer mounted to travel in said tank, and having a horizontal portion near the top of said tank to convey articles through said tank, and a lower portion extended along said inclined bottom, and means arranged to effect the movement of said conveyer in a direction to cause that portion of said conveyer which is in close proximity to said bottom to move in the direction of the declivity of said bottom.

2. A spraying machine having a tank for containing a spraying fluid and provided with an inclined bottom, agitating means comprising a conveyer for carrying articles through said machine and having a portion extending along said inclined bottom to prevent accumulation of precipitate, a horizontal portion extended below the top of said tank, and an inclined portion extending upwardly and arranged to direct articles carried by said conveyer over the edge of said tank, means arranged to receive said articles thus ejected from said tank, a plurality of spraying devices disposed superjacent to said conveyer, a pump arranged to draw fluid from said tank, and to force said fluid through said spraying devices, driving means for said pump, means connected with said driving means and comprising a chain or worm gears operatively connected to effect the rotative movement of said conveyer, and a cover for said spraying devices.

3. A spraying machine having a tank for containing spraying fluid, and provided with an inclined bottom, agitating means comprising a conveyer for carrying articles through said machine and having a portion extending along said inclined bottom to prevent an accumulation of precipitate, a horizontal portion extended below the top of said tank and an inclined portion extending upwardly and arranged to direct articles carried by said conveyer over the edge of said tank, a plurality of spraying devices for directing spray upon articles carried by said conveyer, a pump arranged to draw fluid from said tank and to force said fluid through said spraying device, driving means for said pump and means connected with said driving means operatively connected to actuate said conveyer.

4. In a spraying machine, the combination of a tank, the bottom of which is inclined continuously toward one end and provided with an outlet in the said bottom at its lowest point, a continuous belt-like conveyer extending longitudinally of said tank and having its upward course substantially horizontal and its lower course resting upon said bottom, means to move said conveyer so that the bottom course of said conveyer travels toward said outlet to agitate the liquid in said tank, to keep said bottom clear from deposited matter and to move the same toward said outlet, a plurality of spraying jets arranged superjacent the upper course of said conveyer, and a pump connected to said outlet and to said series of sprayers, a delivery table adjacent the shallow end of said tank, and means to deliver to said table articles from the upper course of said conveyer after the same have been subjected to the action of said sprayers.

In witness whereof, I have hereunto set my hand this 11th day of June, A. D., 1912.

JAMES F. GOUNLEY.

Witnesses:
ALEXANDER PARK,
CLIFTON C. HALLOWELL.